United States Patent [19]

Hayashi et al.

[11] Patent Number: 5,568,456
[45] Date of Patent: Oct. 22, 1996

[54] CROSSTALK CANCELER

[75] Inventors: Hideki Hayashi; Yukiyoshi Haraguchi, both of Tsurugashima, Japan

[73] Assignee: Pioneer Electronic Corporation, Tokyo-to, Japan

[21] Appl. No.: 446,063

[22] Filed: May 19, 1995

[30] Foreign Application Priority Data

May 23, 1994 [JP] Japan ................... 6-108444

[51] Int. Cl.$^6$ ............... G11B 17/22; G11B 7/00
[52] U.S. Cl. ............ 369/132; 369/44.41; 369/124
[58] Field of Search ............... 369/32, 48, 124, 369/275.1, 44.41, 44.28, 44.32, 109, 44.37; 358/328, 329

[56] References Cited

U.S. PATENT DOCUMENTS

| | | | |
|---|---|---|---|
| 4,750,162 | 6/1988 | Tajima | 369/44.41 |
| 5,084,858 | 1/1992 | Maeda | 369/124 |
| 5,153,872 | 10/1992 | Maeda | 369/124 |
| 5,181,161 | 1/1993 | Hirose et al. | 369/48 |
| 5,280,466 | 1/1994 | Tomita | 369/275.1 |

FOREIGN PATENT DOCUMENTS

| | | |
|---|---|---|
| 3-40225 | 2/1991 | Japan . |
| 3-232118 | 10/1991 | Japan . |
| 5-205280 | 8/1993 | Japan . |

*Primary Examiner*—Tan Dinh
*Attorney, Agent, or Firm*—Morgan, Lewis and Bockius LLP

[57] ABSTRACT

A crosstalk canceler includes: unit for obtaining signals of a target track and at least one track neighboring to the target track formed on an optical disc on which crosstalk detection signals are recorded; unit for generating timing signal indicating periods of the crosstalk detection signals; unit for multiplying the signal of the neighboring track by a coefficient to produce a multiplied signal; unit for subtracting the multiplied signal from the signal of the target track to output an output signal; unit for detecting levels of the output signal at the periods of the crosstalk detection signals; and unit for accumulating the levels and outputting the accumulated levels as the coefficient.

7 Claims, 9 Drawing Sheets

CROSSTALK CANCELER

BACKGROUND OF THE INVENTION

1. Field of the Invention

This invention relates to a crosstalk canceler, and more particularly to a crosstalk canceler which efficiently cancels crosstalk generated between neighboring tracks on an optical disc of high recording density.

2. Description of the Prior Art

There have been developed many types of high density information recording methods of an optical disc. One method of accomplishing high density recording irrespective of the size of the disc is to reduce the width of the tracks (i.e., track pitch) on the disc. The spot size of the laser beam is determined by the wavelength of the laser beam and the numerical aperture (NA) of the objective lens. Therefore, when the track pitch is reduced, the laser spot covers not only the target track but the neighboring tracks, and consequently crosstalk arises. In order to eliminate the crosstalk generated due to the reduction of the track pitch, there has been proposed a method of calculating the crosstalk level from the read-out signals of the target track and the neighboring tracks and eliminating the crosstalk to obtain the information signal of only the target track.

According to a known method of crosstalk cancellation, information signals of a target track (center track) and neighboring tracks on both sides thereof are read out by irradiating light beams. In the read-out signal of the center track, crosstalk components from neighboring tracks on both sides are mixed. The ratio of crosstalk, i.e., ratio of the signal of the neighboring track mixed into the center track is prescribed depending upon the relationship between the size of the laser spot and the track pitch and/or other factors. Therefore, by detecting the crosstalk ratio and attenuating the read-out signal of the neighboring track by the attenuation coefficients determined based on the detected crosstalk ratio, a pseudo crosstalk component can be produced. Then, the pseudo crosstalk component is subtracted from the read-out signal of the center track, thereby obtaining the true information of the target track. In this way, by determining appropriate attenuation coefficient, the crosstalk component may be effectively canceled. According to the above method, crosstalk component can be correctly eliminated even in a high density optical disc, and thereby read-out signal of high S/N ratio can be obtained. In this connection, similar crosstalk canceling techniques have been proposed in U.S. Pat. No. 5,280,466 and Japanese Patent Applications Laid-Open under Nos. 3-232118, 340225, and 5-205280.

In the above described method, it is necessary to accurately determine appropriate attenuation coefficients for attenuating the read-out signal of the neighboring tracks. In this view, the techniques proposed in the above mentioned documents set attenuation coefficients of the attenuator or filter coefficients of the filters according to the adapted arithmetic algorithm, and accomplish the arithmetic operation by hardware such as an operation circuitry. However, such arithmetic operations necessarily require a relatively large-scaled circuitry and a long operation time. This is because the arithmetic operation for calculating the attenuation or the filter coefficients needs multiplications and/or divisions. Generally, a multiplication of an N-bits digital number and an N-bits digital number using a digital circuit requires additions for (N-1) times. A division of digital number may be accomplished by repetition of comparisons and subtractions, or multiplication of the inverse of the multiplier, however, these need more complicated processing and a circuitry of larger scale. Namely, multiplication or division requires longer operation time and larger circuit scale of more than (N-1) times compared with addition or subtraction. Namely, the known crosstalk cancellation techniques require a large-scaled circuitry and complicated processing because the arithmetic operation for coefficient determination should include multiple times of multiplications and/or divisions.

SUMMARY OF THE INVENTION

It is an object of the present invention to provide a crosstalk canceler capable of rapidly eliminating crosstalk component with a simplified circuitry.

According to one aspect of the present invention, there is provided a crosstalk canceler including: unit for obtaining signals of a target track and at least one track neighboring to the target track formed on an optical disc on which crosstalk detection signals are recorded; unit for generating timing signal indicating periods of the crosstalk detection signals; unit for multiplying the signal of the neighboring track by a coefficient to produce a multiplied signal; unit for subtracting the multiplied signal from the signal of the target track to output an output signal; unit for detecting levels of the output signal at the periods of the crosstalk detection signals in accordance with the timing signal; and unit for accumulating the levels and outputting the accumulated levels as the coefficient.

In use of the crosstalk canceler thus configured, the timing signal generating unit generates the timing signal which indicates the periods of the crosstalk detection signals when the optical disc is rotated and the recorded signals are read out from the optical disc. The level detecting unit detects the levels of the output signal at the periods of the crosstalk detection signals. Since the level of the output signal thus detected indicates the level of the remaining crosstalk component, the accumulating unit accumulates the levels to produce a new coefficient. The multiplying unit produces the multiplied signal using this new coefficient, and the subtracting unit outputs the output signal from which the crosstalk component is further eliminated. In this way, the crosstalk component is finally completely eliminated from the output signal.

The nature, utility, and further features of this invention will be more clearly apparent from the following detailed description with respect to preferred embodiment of the invention when read in conjunction with the accompanying drawings briefly described below.

DESCRIPTION OF THE PREFERRED EMBODIMENTS

Preferred embodiments of the present invention will be described below with reference to the accompanying drawings.

1st Embodiment

Figure 1A:
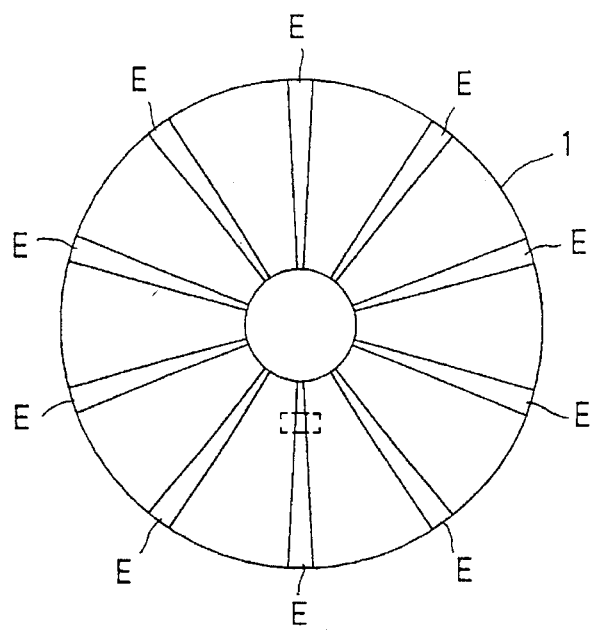
FIG. 1A is a view illustrating a configuration of an optical disc used in the present invention.
Figure 1B:
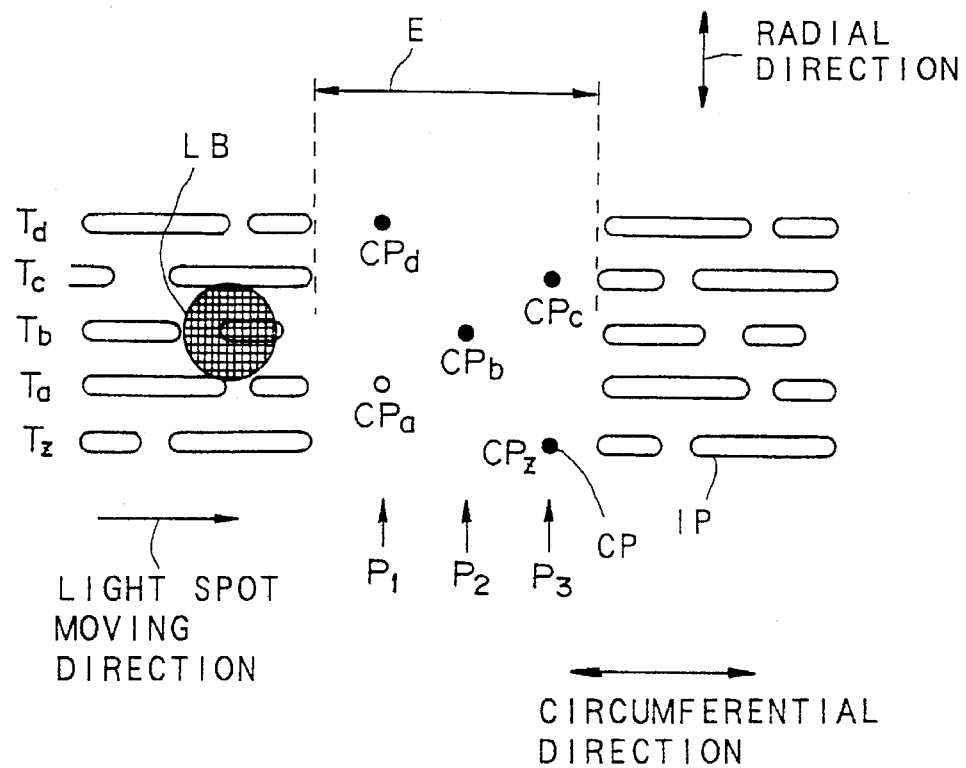
FIG. 1B is an enlarged view illustrating a crosstalk detection area of the optical disc shown in FIG. 1A.

FIG. 1A is a view illustrating a configuration of an optical disc used in the present invention. On the optical disc 1, a signal track is formed spirally from the inner circumference to outer circumference, like a known optical disc. In addition, the optical disc 1 is provided with a plurality of crosstalk detection areas E formed in radial direction of the disc. FIG. 1B is an enlarged view illustrating a portion of crosstalk detection area E of the optical disc 1. In FIG. 1B, five tracks $T_a$–$T_d$ and $T_z$ are illustrated. These tracks are five turns of the single signal track formed on the optical disc, but can be assumed to be parallel tracks within this small area. As shown in FIG. 1B, no information pit IP is formed on the crosstalk detection area E but crosstalk detection pits CP are formed in a predetermined manner. Specifically, the crosstalk detection pits CP are arranged in such a manner that each of them are positioned out of alignment with each other in the radial direction of the disc at least between two neighboring tracks. Namely, with respect to a crosstalk detection pit CP (e.g., $CP_b$) on a track, no crosstalk detection pits is formed on the both neighboring tracks (i.e., tracks $T_a$ and $T_c$) at the positions in alignment with the crosstalk detection pit $CP_b$ in the radial direction of the disc. When the light spot LB tracing the track enters the crosstalk detection area E, a read-out signal indicating the presence of the crosstalk detection pit CP is obtained. The crosstalk detection areas E are formed in predetermined blocks (e.g., header block) of a plurality of information recording blocks successively formed on the optical disc.

Figure 2:
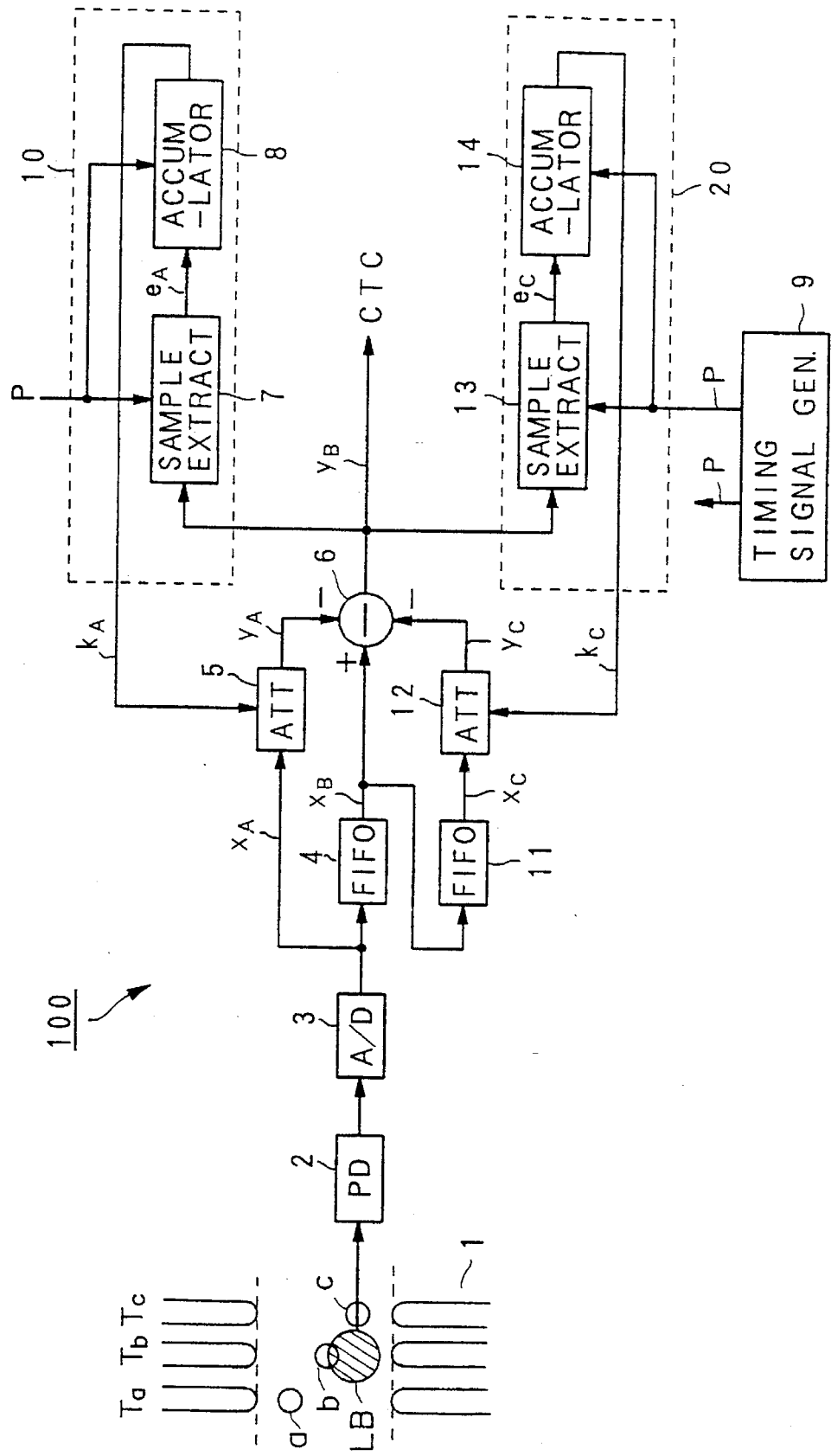
FIG. 2 is a block diagram illustrating a configuration of a crosstalk canceler according to a first embodiment.

FIG. 2 illustrates components of a crosstalk canceler 100 according to the first embodiment of the invention. As shown in FIG. 2, the crosstalk canceler 100 includes a photodetector 2, an A/D converter 3, FIFO memories 4 and 11, attenuators 5 and 12, a subtracter 6, error operation units 10 and 20, and a timing signal generator 9. The photodetector 2 receives the light beam reflected by the optical disc 1 and outputs an RF signal corresponding to the reflected light beam. The A/D converter 3 converts the RF signal reproduced from the optical disc 1 into a digital information signal $x_A$ by the sampling frequency of the system (e.g., 10 MHz). The FIFO memory 4 stores the information signal $x_A$ for the capacity of one track and outputs it with a delay time corresponding to read-out time period of one track, i.e., a time required for tracing one track. The attenuator 5 multiplies the information signal $x_A$ by an attenuation coefficient $k_A$ supplied by the error operation unit 10, and supplies an information signal $y_A$ to the subtracter 6. The subtracter 6 subtracts the information signals $y_A$ and $y_B$ from the signal $x_B$. The FIFO memory 11 receives the delayed signal $x_B$ from the FIFO memory 4, and gives another delay time corresponding to one track to the delayed signal $x_B$ so as to output a delayed signal $x_C$ which is behind the information signal $x_A$ by the delay time corresponding to two tracks. The attenuator 12 multiplies the delayed signal $x_C$ by an attenuation coefficient $k_C$ supplied by the error operation unit 20, and outputs the information signal $y_C$ to the subtracter 6. The error operation units 10 and 20 produce the attenuation coefficients $k_A$ and $k_C$ from the information signal $y_B$, respectively. The timing signal generator 9 generates and supplies timing signal P indicating the periods of the crosstalk detection areas E to the error operation units 10 and 20, respectively. Since the pattern of arranging the crosstalk detection pits CP is predetermined, the timing signal P may be produced according to the pattern. Details of the timing signal P will be described later. The error operation unit 10 includes a sample extractor 7 and an accumulator 8. The sample extractor 7 receives the information signal $y_B$ and outputs an error signal $e_A$ using the timing signal P, and the accumulator 8 accumulates the error signal $e_A$ to produce the attenuation coefficient $k_A$. The error operation unit 20 includes a sample extractor 13 and an accumulator 14 identical to the sample extractor 7 and the accumulator 8, respectively.

Next, an operation of the crosstalk canceler 100 will be described. As shown in FIG. 2, the crosstalk canceler 100 utilizes a single light beam. The crosstalk between the tracks $T_a$ and $T_b$ is determined by the relationship between the information signals $x_A$ and $x_B$, and the crosstalk between the tracks $T_c$ and $T_b$ is determined by the relationship between the information signals $x_C$ and $x_B$. Therefore, the components processing the information signal $x_A$ (i.e., attenuator 5 and error operation unit 10) and the components processing the information signal $x_C$ (i.e., attenuator 12 and error operation unit 20) function independently of each other. As a result of the delay functions of the FIFO memories 4 and 11, the information signals $x_A$, $x_B$ and $x_C$ include recorded information of the tracks $T_a$, $T_b$ and $T_c$ aligned in one radial direction of the disc 1. Namely, the information signals $x_A$, $x_B$ and $x_C$ have the same relationship therebetween as the case where recorded information of the tracks $T_a$, $T_b$ and $T_c$ are simultaneously read out by three light beams. By multiplying the information signal $x_A$ by the attenuation factor $k_A$, the pseudo crosstalk component $y_A$ from the track $T_a$ to the track $T_b$ is obtained. Similarly, by multiplying the information signal $x_C$ by the attenuation factor $k_C$, the pseudo crosstalk component $y_C$ from the track $T_c$ to the track $T_b$ is obtained. The crosstalk components from the tracks $T_a$ and $T_c$ are detected independently of each other, and are subtracted from the information signal $y_B$ at the subtracter 6 independently of each other. In this way, the components processing the information signal $x_A$ of the track $T_a$ and the components processing the information signal $x_C$ of the track $T_c$ do not depend on each other. In this view, the following description will be directed only at the operation of the components processing the information signal $x_A$. The components processing the information signal $x_B$ performs the same operation.

When the optical disc 1 is rotated, the light spot LB covers not only the track $T_b$ but also the neighboring tracks $T_a$ and $T_c$, and hence the crosstalk from the neighboring tracks $T_a$ and $T_c$ are generated due to the intermixtures of the lights reflected by the pits on the neighboring tracks. In the meantime, the light spot LB on the track $T_b$ enters the crosstalk detection area E (see. FIG. 1B). When the light spot LB passes the position $P_1$ in FIG. 1B, the light spot LB only covers a portion of the crosstalk detection pit $CP_a$, and therefore the read-out signal outputted by the photodetector 2 includes only the crosstalk component of the crosstalk detection pit $CP_a$ on the track $T_a$. Then, when the light spot LB passes the position $P_3$, the light spot LB only covers a portion of the crosstalk detection pit $CP_c$, and therefore the read-out signal includes the crosstalk component of the crosstalk detection pit $CP_c$ on the track $T_c$. In this way, the crosstalk components from the both neighboring tracks are detected, and the crosstalk components can be eliminated by measuring the levels of the light beams reflected by the crosstalk detection pits on the neighboring tracks, i.e., levels of the signal thus detected.

Figure 5:
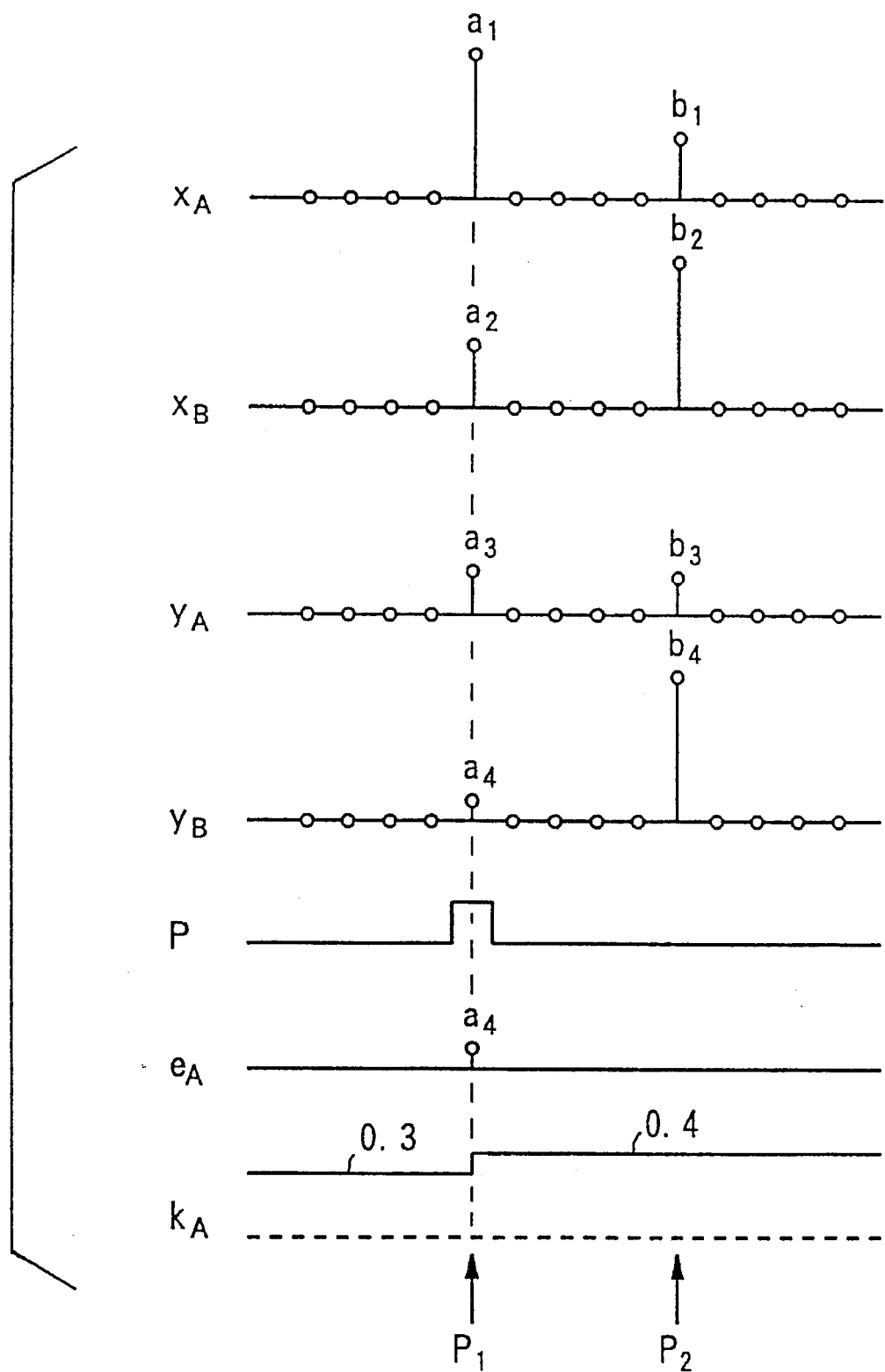
FIG. 5 is a diagram illustrating waveforms of signals detected in the crosstalk detection area.

FIG. 5 illustrates the signals detected in the crosstalk detection area E. The dots in the figure indicate sampling timings generated from the system clock (e.g., frequency 10 MHz). It is assumed that the magnitude level of the signal of the center track is "1" (absolute value) and the ratio of the crosstalk (i.e., ratio of the magnitude level of the signal mixed into the center track from the neighboring track) is "0.4". As seen from FIG. 1B and 5, the information signal $x_A$ indicates the value $a_1$ corresponding to the magnitude level "1" when the light spot LB passes the crosstalk detection pit $CP_a$. The information signal $x_B$ of the center track $T_b$ indicates the value $b_2$ corresponding to the magnitude level "1" when the light spot LB passes the crosstalk detection pit $CP_b$. The information sinal $x_A$ indicates the value $b_1$ (magnitude level 0.4) at the position $P_2$ due to the presence of the pits $CP_b$ on the center track $T_b$, and the information signal $x_B$ indicates the value $a_2$ (magnitude level 0.4) at the position $P_1$ due to the presence of the pit $CP_a$ on the track $T_a$. In the initial setting before starting the reproduction of the optical disc 1, the attenuation factor $k_A$ has been set in the accumulator 8 as the initial value. Assuming that the initial attenuation factor $k_A$ is "0.3", the information signal $y_A$ is calculated as:

$$y_A = x_A \times k_A,$$

and the values $a_3$ and $b_3$ are obtained as follows:

$$a_3 = k_A \times a_1 = 0.3 \times 1 = 0.3,$$

$$b_3 = k_A \times b_1 = 0.3 \times 0.4 = 0.12.$$

Since the output $y_B$ of the subtracter 6 is obtained by subtracting the signal $y_A$ from the signal $x_B$ (i.e. $y_B = x_B - y_A$), the values $a_4$ and $b_4$ are obtained as follows:

$$a_4 = a_2 - a_3 = 0.4 - 0.3 = 0.1,$$

$$b_4 = b_2 - b_3 = 1 - 0.12 = 0.88.$$

In this way, the crosstalk ratio $a_2$ (=0.4) in the signal $x_B$ before the subtraction by the subtracter 6 is reduced to $a_4$ (=0.1) after the subtraction. However, the crosstalk component still remains. The information signal $y_B$ after the subtraction is supplied to the sample extractor 7 in which the error signal $e_A$ is extracted at the timing of the timing signal P.

Figure 6A:
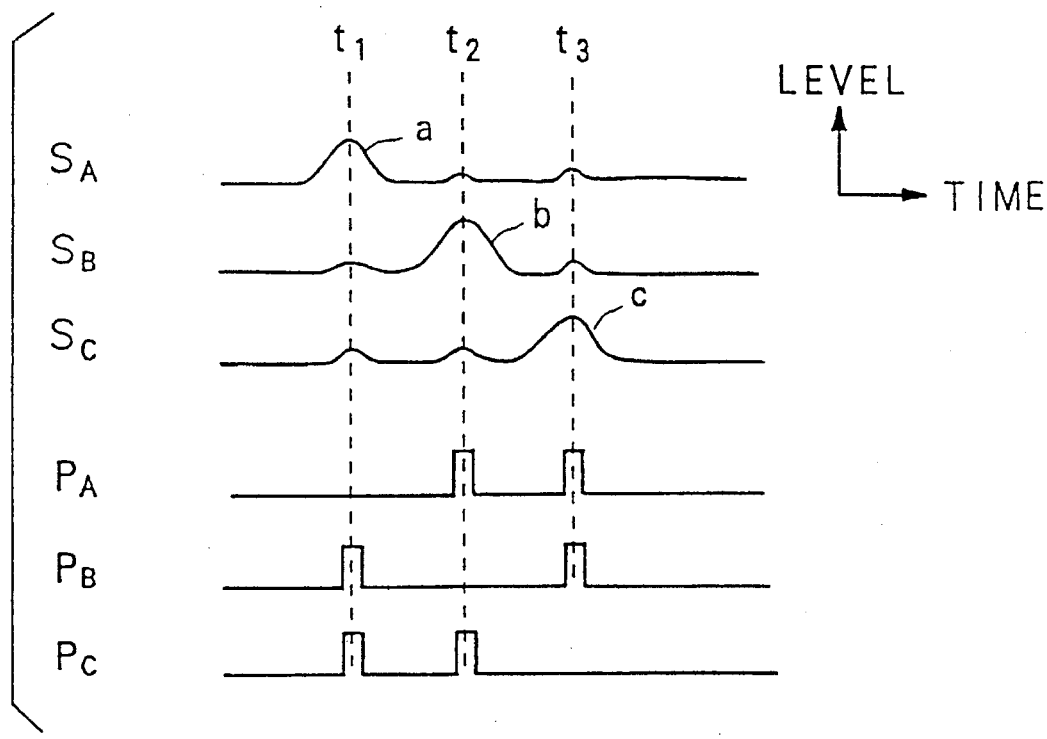
FIG. 6A is a diagram illustrating waveforms of read-out signals of the optical disc and timing signals.

FIG. 6A illustrates waveforms of the read-out signals $S_a$–$S_c$ of the tracks $T_a$–$T_c$ in the crosstalk detection area E and timing signals $P_a$–$P_c$. As shown in FIG. 6A, the read-out signals $S_a$–$S_c$ of the tracks $T_a$–$T_c$ become high level at the positions a–c corresponding to the crosstalk detection pits $CP_a$–$CP_c$. The timing signals $P_A$–$P_c$ include pulses at the read-out timings of the crosstalk detection pits CP. Since the crosstalk detection pits $CP_a$–$CP_c$ are formed on the tracks $T_a$–$T_c$ within the crosstalk detection area E, the photodetector 2 outputs signals corresponding to the presence of the crosstalk detection pits CP. The timing signals $P_A$–$P_c$ represent timing pulses corresponding to timings at which neighboring tracks have the crosstalk detection pits CP. The timing signal $P_A$ including pulses at the timings $t_2$ and $t_3$ is used when the light spot LB is tracing the track $T_a$, and the timing signal $P_B$ including pulses at the timings $t_1$ and $t_3$ is used when the light spot LB is tracing the track $T_b$. Namely, timing pulses appear at the timings at which the crosstalk detection pits existing on the neighboring tracks are detected. When the crosstalk components from the tracks $T_a$ and $T_c$ to the track $T_b$ are detected, the timing signal generator 9 generates the timing signal $P_B$ having timing pulses at the timings $t_1$ and $t_3$, i.e., the timings of the crosstalk detection pit $CP_a$ and $CP_c$, so as to detect the crosstalk components from the tracks $T_a$ and $T_c$ to the track $T_b$. Namely, the timing signal generator 9 supplies the timing signal $P_A$ to the error operation units 10 and 20 when the light spot LB is tracing the track $T_a$ and supplies the timing signal $P_B$ to the error operation units 10 and 20 when the light spot LB is tracing the track $T_b$.

Figure 6B:
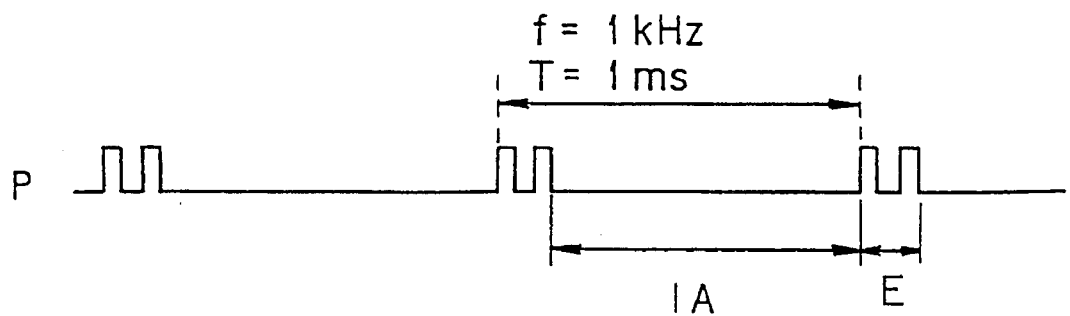
FIG. 6B is a diagram illustrating a waveform of the timing signal.

FIG. 6B illustrates the waveform of the timing signal P. As shown in FIG. 6B, the timing signal P includes the timing pulses at the timings of the crosstalk detection pits on the neighboring tracks, at every periods T (e.g., 1 ms) prescribed by the intervals of the crosstalk detection areas E and the rotation velocity of the optical disc 1. The positions of the timing pulses are determined in correspondence with the positions of the crosstalk detection pits in the crosstalk detection area E, as seen in FIG. 6A. According to the timing signal P, the sample extractor 7 samples the level of the crosstalk component of the crosstalk detection pit on the neighboring track as the error signal $e_A$. Namely, the error signal $e_A$ indicates the level of the crosstalk component of the pit $CP_a$ mixed into the track $T_b$ from the neighboring track $T_a$. The accumulator 8 accumulates the error signal $e_A$. Since the initial attenuation factor $k_A$ is 0.3, $a_4$ (= 0.1) is added as the new error signal $e_A$. The attenuation factor $k_A$ is renewed as follows:

$$k_A = 0.3 + 0.1 = 0.4.$$

The attenuation factor $k_A$ thus renewed is fed back to the attenuator 5, and therefore the system constitutes a kind of servo loop. With the aid of the feedback control function of the servo loop, the accumulator 8 accumulates the error signal $e_A$ so that the attenuation factors $k_A$ follows the variation of the crosstalk, thereby stable crosstalk cancellation is carried out.

Figure 3A:
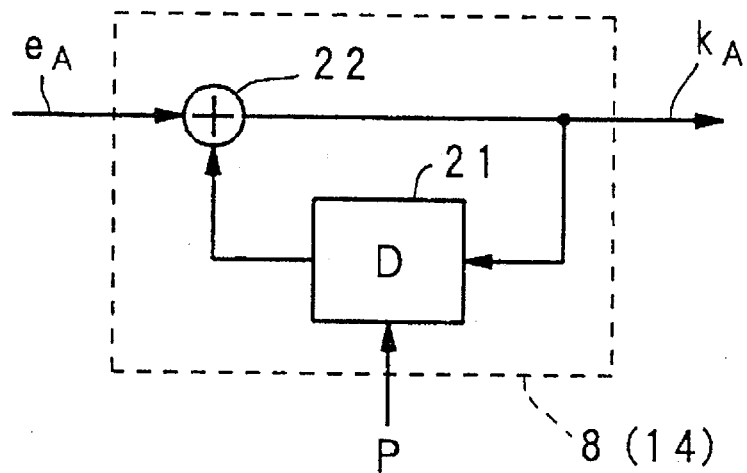
FIG. 3A and 3B are block diagrams illustrating a first and a second examples of the accumulator shown in FIG. 2.

FIGS. 3A, 3B, 4A and 4B illustrate configurations of the accumulator 8. FIG. 3A shows a first example of the accumulator 8 which accumulates the attenuation factors. The error signal $e_A$ is added to the output signal of the delay element 21, which is delayed by a predetermined delay time, by the adder 22. The delay element 21 receives the timing signal P, and the attenuation factor $k_A$ renewed at the last crosstalk detection area E is outputted from the delay element 21 at the read-out timing of the subsequent crosstalk detection area E. When the level of the crosstalk does not vary, the error signal $e_A$ is zero and the output of the adder 22 does not vary.

Figure 3B:
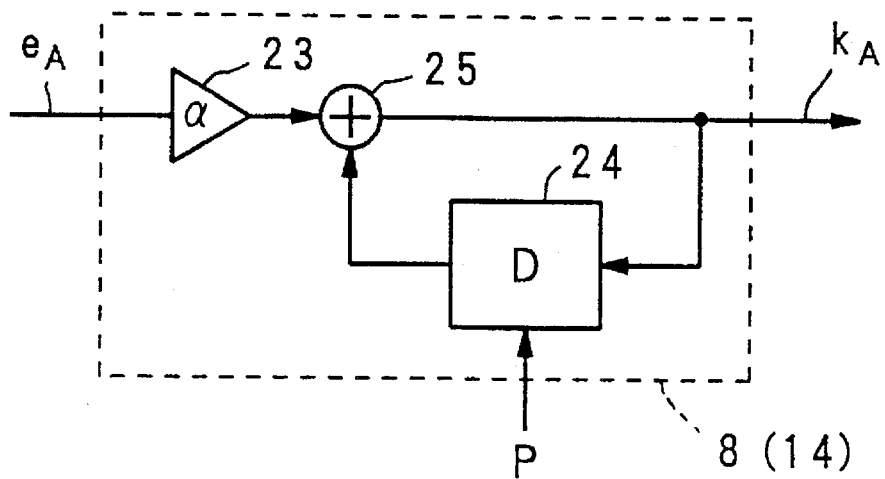

FIG. 3B shows a configuration of the second example of the accumulator 8 in which the factor multiplier 23 is employed to multiply the error signal $e_A$ by the factor α. Normally, in order to let the servo loop stably converge, a multiplier for multiplying the error signal by a factor is employed. If the factor is determined to be exponential values of 2, e.g., ½, ¼, ⅛, . . . , the multiplication of the factor can be performed by a simple bit-shifting of the error signal $e_A$, and a shift register may be employed as the multiplier 23.

Figure 4A:
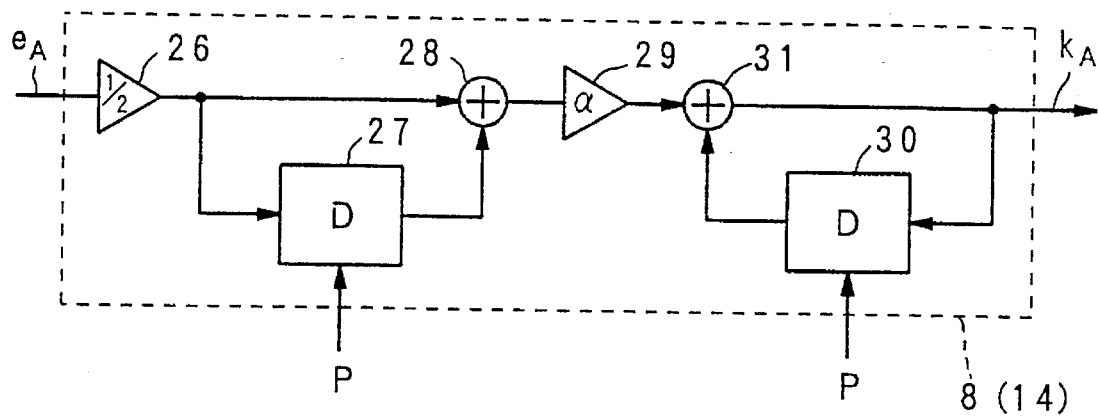
FIG. 4A and 4B are block diagrams illustrating a third and a fourth examples of the accumulator shown in FIG. 2.

FIG. 4A is a block diagram of the third example of the accumulator 8 in which the factor multiplier 26, the delay element 27 and the adder 28 produce the average of the previous error signals $e_A$ and the current error signal $e_A$. Since the factor multiplier 26 has a multiplier 1/2, it may be constituted by a shift register. The components 29–31 are identical to the components 23–25 shown in FIG. 3B. According to this configuration, the input-output characteristics has exact integration characteristics, and therefore freedom in design of the servo loop may be improved.

Figure 4B:
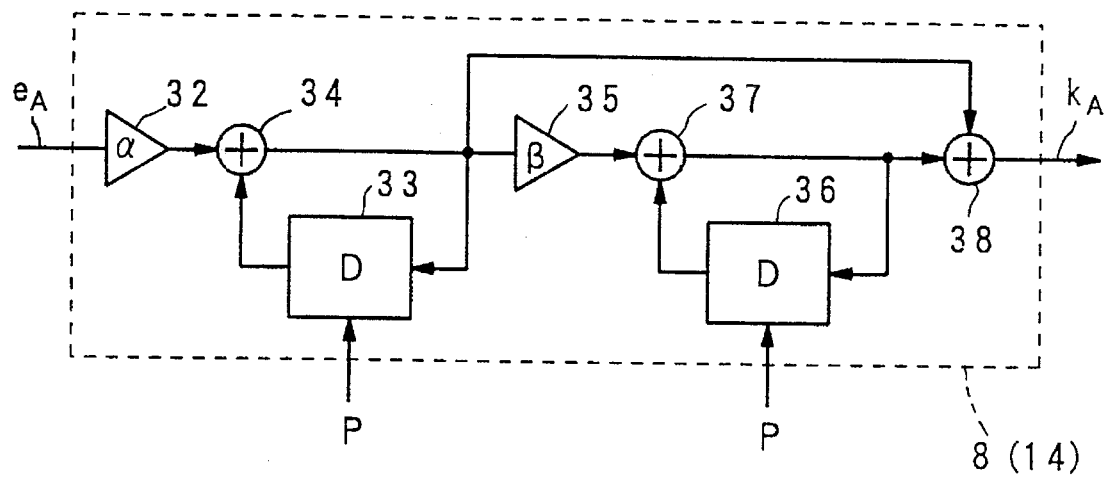

FIG. 4B is a block diagram of the fourth example of the accumulator 8. In this example, the circuit shown in FIG. 3B are arranged in cascade connection, and the outputs of them are added by the adder 38. This circuit performs double integration, and therefore the freedom in design of the servo loop may be improved by determining appropriate factors α and β.

In this way, the accumulator 8 may be designed in various configurations so as to accomplish the desired characteristics, such as stability and quick response, required for the servo loop. In respect to the error operation unit 20 for eliminating the crosstalk between the tracks $T_b$ and $T_c$, the configuration and the performance of the sample extractor 13 and the accumulator 14 are identical to those of the extractor 7 and the accumulator 8.

As described above, according to the first embodiment, remaining crosstalk component is extracted as error signal and the attenuation factor is renewed appropriately based on the remaining crosstalk component. Therefore, when the servo loop thus constructed converges, the crosstalk component may be completely eliminated. In addition, the attenuation factor can be renewed by addition only, that is, without multiplications or divisions, and the crosstalk may be cancelled, by a simplified configuration, every time the read-out light spot enters the crosstalk detection areas E.

2nd Embodiment

Figure 7A:
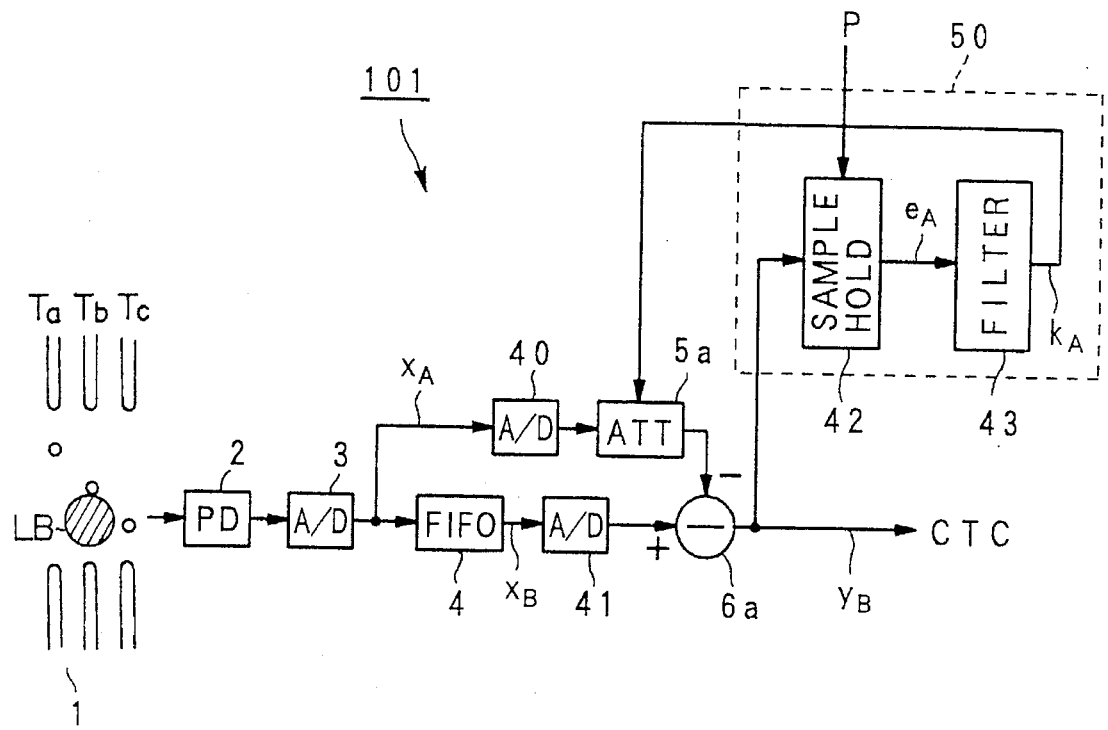
FIG. 7A is a block diagram illustrating a configuration of the crosstalk canceler according to the second embodiment.
Figure 7B:
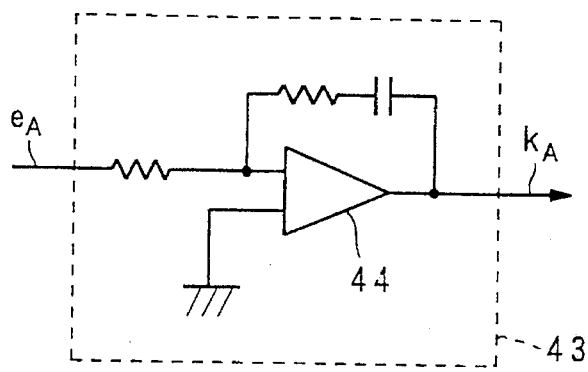
FIG. 7B is a block diagram illustrating a configuration of the filter shown in FIG. 7A.

In the second embodiment, the calculation of the attenuation factor is carried out by an analog circuit. FIG. 7A illustrates a configuration of the crosstalk canceler 101 according to the second embodiment. It is noted that the components processing the information signal from the track $T_c$ are omitted from the illustration, for the sake of simplicity. As shown in FIG. 7A, the crosstalk canceler 101 is provided with D/A converters 40 and 41 which convert the digital information signals $x_A$ and $x_B$ into analog signals. In addition, the attenuator 5a and the subtracter 6a are designed for analog signal processing. The error operation unit 50 includes a sample-hold circuit 42 for sampling and holding the output signal $y_B$ and a filter 43 for integrating the error signal $e_A$ from the sample-hold circuit 42. Since other components are identical to those of the first embodiment, identical reference numbers are attached to them and the description thereof will be omitted. In this embodiment, the operation performed in the first embodiment by digital signal processing is performed by analog signal processing. In the crosstalk detection area E, the sample-hold circuit 42 holds the level of the error signal $e_A$ according to the timing pulses of the timing signal P. Namely, if the crosstalk component remains at that time, its level is held by the sample-hold circuit 42. The filter 43 may be an integrator constituted by an operational amplifier 44, resistors and a capacitor, as shown in FIG. 7B. When the remaining crosstalk component is supplied as the error signal $e_A$, the filter 43 accumulates the remaining crosstalk component to produce the renewed attenuation factor $k_A$. In this way, the renewal of the attenuation factor is carried out by analog signal processing. The attenuator 5a is an analog multiplier, such as a VCA or the like, and multiplies the information signal $x_A$ by the attenuation factor $k_A$. The filter circuit may be an integrator of different type. As described above, according to the second embodiment, crosstalk cancellation can be performed by analog signal processing. Namely, according to the first and the second embodiments, the crosstalk cancellation of the present invention may be performed by both digital and analog signal processing, and the freedom of the circuit design may be improved.

3rd Embodiment

Figure 8:
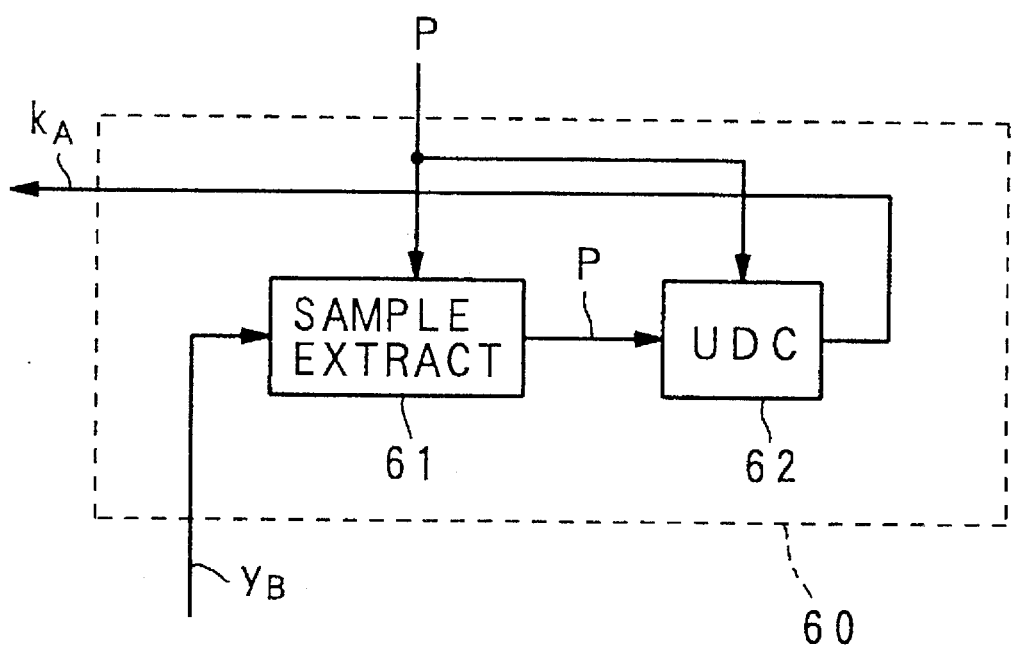
FIG. 8 is a block diagram illustrating a configuration of an error operation unit according to the third embodiment.

In the above described embodiments, the remaining crosstalk component is detected, and its level is added to the previous attenuation factor as the error signal. In contrast, in the third embodiment, the polarity of the error signal is detected and the attenuation factor is varied based on the detected polarity of the error signal. The configuration of the crosstalk canceler according to the third embodiment is identical to that of the first embodiment, except for the configuration of the error operation unit 10. FIG. 8 illustrates a configuration of the error operation unit 60. As illustrated, the error operation unit 60 includes a sample extractor 61 for outputting a polarity flag p, indicating the polarity of the error signal $e_A$, detected from the information signal $y_B$ according to the timing signal P, and an up-down counter 62 for incrementing and decrementing the count value (i.e., attenuation factor) in accordance with the polarity flag p.

Next, the operation will be described. The sample extractor 61 keeps on monitoring the MSB (Most Significant Bit) of the digital information signal $y_B$. Since the digital signal $y_B$ is coded in such a manner that the MSB reverses according to the polarity of the value, the MSB may be used as the polarity flag p. The sample extractor 61 outputs, as the polarity flag p, the polarity of the information signal $y_B$ at the timing of the timing pulse of the timing signal P. The sample extractor 61 has a latch function like a flip-flop circuit, and latches the MSB of the information signal $y_B$ using the timing signal P as clock trigger signal. The relationship between the information signal $y_B$ and the polarity flag p is as follows:

if $y_B \geq 0$; $p=1$, and if $y_B < 0$; $p=0$.

The up-down counter 62 counts up or down the digital value according to the polarity flag p. For example, if the remaining crosstalk component has a positive level, i.e., $y_B \geq 0$; p=1, the up-down counter counts up. As a result, the attenuation factor $k_A$ increases. As the counting clock of the up-down counter 62, the timing signal P is used. In this case, the attenuation factor $k_A$ changes by one according to the polarity flag p, and finally converges on an appropriate value. The relationship between the polarity flag p and the counting direction of the up-down counter 62 (to positive or negative value) may be reversed. In such a case, the polarity of the attenuation factor $k_A$ is controlled. It is necessary that the relationship between the polarity flag p and the counting direction is determined so as to make the counted value correctly converge. As described above, according to the third embodiment, the attenuation factor $k_A$ may be obtained by a simple circuit, without employing multipliers and dividers.

4th Embodiment

In the above described embodiments, attenuators are used for generating the pseudo crosstalk components. However, when the crosstalk component is measured on the optical disc in practice, it may found that the frequency of the information signal on the center track does not coincide with those of the neighboring tracks. It is supposed that the difference of the frequencies results from the difference of the intensity distribution of the light beam LB between the central area of the light spot and the edge area thereof. As a result, there may happen a problem that the crosstalk component is cancelled sufficiently only in a certain frequency band and the cancellation is insufficient in other frequency band. From this view, in this embodiment, a filter for compensating for the difference of frequency characteristics is employed in a system which processes the information signal of the neighboring track, thereby absorbing the unevenness of the crosstalk components in different frequencies.

Figure 9A:
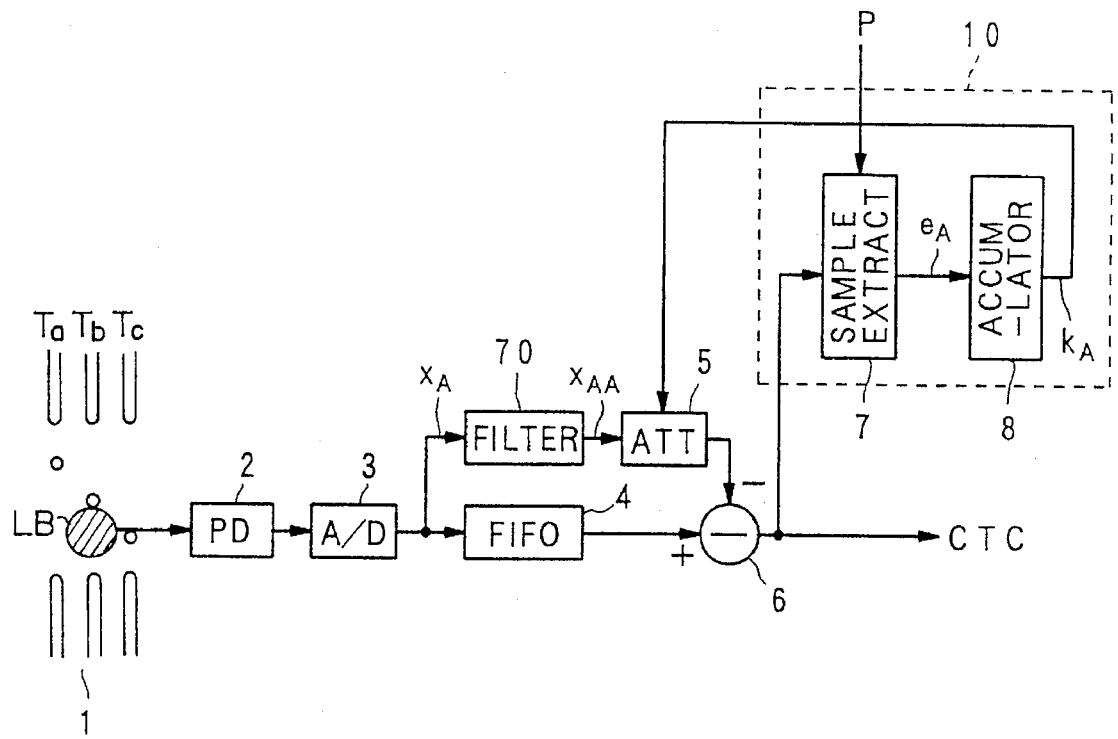
FIG. 9A is a block diagram illustrating a configuration of a crosstalk canceler according to the fourth embodiment.
Figure 9B:
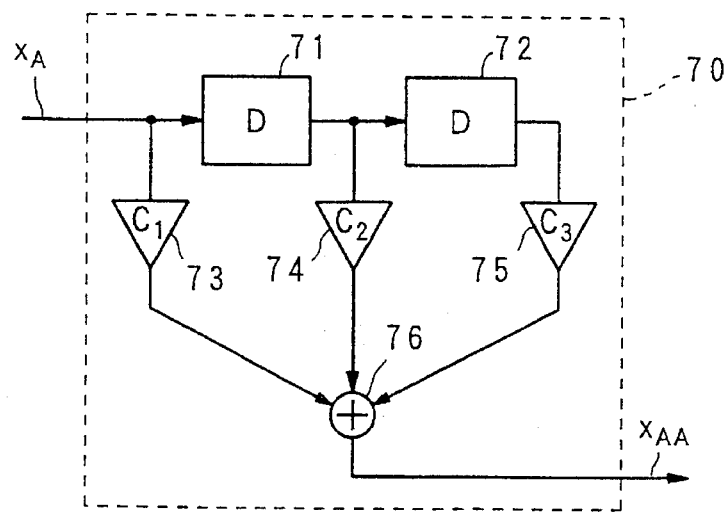
FIG. 9B is a block diagram illustrating a configuration of the filter shown in FIG. 9A.

FIG. 9A illustrates a configuration of a crosstalk canceler according to the fourth embodiment. As shown in FIG. 9A, a filter 70 is provided before the attenuator 5 so that the filter 70 receives the information signal $X_A$ and outputs the information signal $X_{AA}$ whose frequency characteristics is controlled. FIG. 9B illustrates the configuration of the filter 70. The filter 70 is a FIR (Finite Impulse Response) digital filter having three taps, and includes delay elements 71 and 72, coefficient multipliers 73–75 and an adder 76. It is noted that the order of the digital filter may be changed to accomplish the desired frequency characteristics. In stead of this, DSP (Digital Signal Processor) may be employed. In FIG. 9A, the system for processing the information signal of the neighboring track $T_c$ and the timing generator 9 are omitted from the illustration, for brevity's sake. In order to apply this embodiment to the system processing the crosstalk from the track $T_c$, the same filter may be inserted before the attenuator 12 (see. FIG. 2) in the same manner. The frequency compensation characteristics of the filter 70 is determined according to experimental results or theoretical calculations, and the filter coefficients $C_1$–$C_3$ of the multipliers 73–75 are set to achieve the designed characteristics. If the coefficients $C_1$–$C_3$ are designed to be exponential values such as ½, ¼, . . . , shift registers may be employed as the multipliers, thereby the circuit configuration can be simplified. The configuration of the filter 70 shown in FIG. 9B is merely an example, and should be varied according to the desired frequency characteristics. In many cases, the frequency characteristics of the remaining crosstalk component is stable because it depends upon the characteristics of the optical disk, and therefore the coefficients of the filer may be fixed to accomplish fixed filter characteristics. The filter of fixed coefficients may be designed more easily than the filter having variable coefficients, and is superior in following speed and converging ability. In case of employing the analog circuit configuration like the second embodiment, the filter may be an active filter utilizing operational amplifiers. The position of the filter is not limited to the position illustrated in FIG. 9A. Since the purpose of the filter is to compensate for the frequency difference of two information signals on different tracks, it may be arranged either one of the two processing systems at any position therein. Namely, the filter may be arranged after the signal processing components or the attenuator. As described above, according to the fourth embodiment, the difference in the frequency characteristics of information signals can be compensated for by employing the filter to the systems of the first to third embodiments.

The present invention may be embodied in other various forms. Although the crosstalk canceler of the above embodiments are of single light beam type, this invention is applicable to three beams type apparatus. In such a case, three light beams reflected by the optical disc are received by three photodetectors. Other portion may be configured in the same manner as the above described embodiments.

As described above, according to the present invention, many multipliers and dividers for the calculation of the attenuation coefficient may be omitted, and crosstalk cancellation may be rapidly performed by a simple circuitry. Particularly, the crosstalk quantity varies when the tracing of the light spot with respect to the track is unstable due to the incompletion of tracking servo control (e.g., when the optical disc has curvature), or when recording density of the optical disc differs in different positions in radial direction thereof. Even in such cases, the crosstalk canceler of this invention can rapidly follow up the variation of the crosstalk. In addition, deficiencies such as the deterioration of convergence or oscillation of the attenuation factor can be avoided, and stable performance is ensured. Further, since the crosstalk canceler of this invention may be configured by a simple digital circuit, it is adaptive to IC (Integrated Circuit) configuration.

The invention may be embodied on other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning an range of equivalency of the claims are therefore intended to be embraced therein.

What is claimed is:

1. A crosstalk canceler comprising:
   means for obtaining signals of a target track and at least one track neighboring to the target track formed on an optical disc on which crosstalk detection signals are recorded;
   means for generating timing signal indicating periods of the crosstalk detection signals;
   means for multiplying the signal of the neighboring track by a coefficient to produce a multiplied signal;
   means for subtracting the multiplied signal from the signal of the target track to output an output signal;
   means for detecting levels of the output signal at the periods of the crosstalk detection signals in accordance with the timing signal; and
   means for accumulating the levels and outputting the accumulated levels as the coefficient.

2. A crosstalk canceler according to claim 1, wherein said accumulating means comprises means for storing the coefficient obtained at the period of the last crosstalk detection signal, and means for adding the level of the output signal to the stored coefficient.

3. A crosstalk canceler according to claim 1, wherein said detecting means detects polarity of the output signal, and said accumulating means comprises an up-down counter for increasing and decreasing the coefficient in accordance with the polarity of the output signal detected.

4. A crosstalk canceler according to claim 1, wherein said detecting means comprises a sample-hold circuit for holding the level of the output signal, and said accumulating means comprises an integration circuit for integrating the levels held by the sample-hold circuit.

5. A crosstalk canceler according to claim 1, further comprising means for compensating for a difference in frequency characteristics between the signals of the target track and the neighboring track.

6. A crosstalk canceler according to claim 1, wherein said optical disc comprises a plurality of crosstalk detection areas extending in a radial direction of the optical disc for a length covering at least two tracks, said crosstalk detection signals being recorded in each of the crosstalk detection areas in such a manner that the crosstalk detection signals are out of alignment with each other in the radial direction.

7. A crosstalk canceler according to claim 1, wherein said signal obtaining means comprises a light irradiating means for irradiating a light beam onto the optical disc, a photodetector for detecting the signal of the track on which light beam is irradiated, and at least one delaying means for delaying the signal outputted by the photodetector.

* * * * *